Figure 1A:
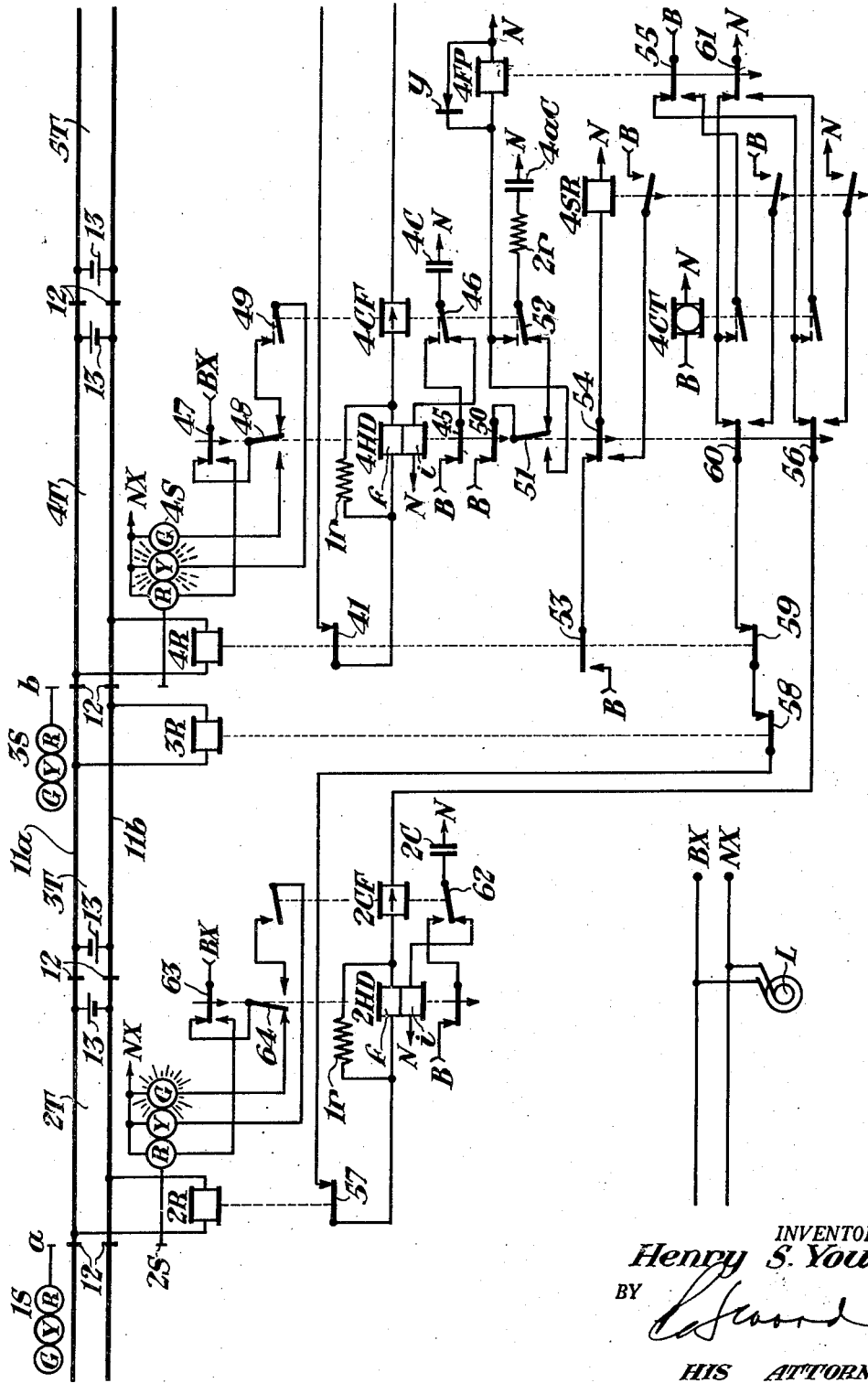

INVENTOR.
Henry S. Young.
BY
HIS ATTORNEY

Patented Oct. 26, 1954

2,692,942

UNITED STATES PATENT OFFICE 2,692,942

FOUR-INDICATION SIGNAL CONTROL SYSTEM EMBODYING POLAR BIASED CODE FOLLOWING AND POLARIZED LINE RELAYS

Henry S. Young, Wilkinsburg, Pa., assignor to Westinghouse Air Brake Company, a corporation of Pennsylvania Application December 30, 1950, Serial No. 203,694

12 Claims. (Cl. 246—46)

My invention relates to a four-indication signal control system embodying polar biased code following and polarized line relays. More particularly, my invention relates to auxiliary control means for a polarized line relay which is connected in series with a polar biased code following relay in a signal control circuit which at times is energized by steady current and at other times is energized by periodically interrupted or coded current, and to control means for a repeater relay controlled by the polar biased code following and polarized line relays, in such a signal control system.

The apparatus of my invention is an improvement over that which is disclosed in a copending application, Serial No. 739,694, filed April 5, 1947, by Thomas W. Tizzard, Jr., now Patent No. 2,638,536, for Four-Indication Signal Control System Embodying Polar Biased Code Following and Polarized Line Relays.

In order to produce a suitable polarized relay for a signal control system, in which the polarized relay is at times energized by periodically interrupted current, and in which it is necessary for front neutral contacts of the polarized relay to become closed and to remain closed in response to energization of the polarized relay by periodically interrupted current, considerable engineering and development might be required.

An object of my invention, therefore, is the provision of auxiliary means for so controlling a polarized relay of well-known design for response to steady current, that front contacts of the relay will remain closed in response to energization of the polarized relay by periodically interrupted current.

A feature of my invention for attaining this object is the provision of a polarized signal control relay of well-known design for response to steady current, having two control windings, a first of which windings is connected in a control circuit in series with a code following relay, which circuit is supplied at times with steady current and at other times with periodically interrupted current, and the second of which windings is energized by auxiliary means, controlled by the code following relay, during the periods of interruption of the periodically interrupted current which is supplied to the control circuit.

In a four-indication signal control system in which a control circuit includes a polarized relay in series with a code following relay and is energized at times by periodically interrupted current, if the code following relay should become inoperative, so that it did not open its back contacts in response to periodically interrupted current, a signal might be controlled to display an indication which is less restrictive than should be displayed.

Another object of my invention, therefore, is the provision of means to check the operation of the code following relay, so that a signal will not be controlled to display a less restrictive indication than should be displayed, if the code following relay should become inoperative.

A feature of my invention for attaining this object is the provision of auxiliary means for energizing a repeater relay, controlled by the polarized and code following relays, only if the code following relay is operating at times when it should be responding to periodically interrupted current.

I shall describe one form of apparatus embodying my invention, and shall then point out the novel features thereof in claims.

Figure 1B:
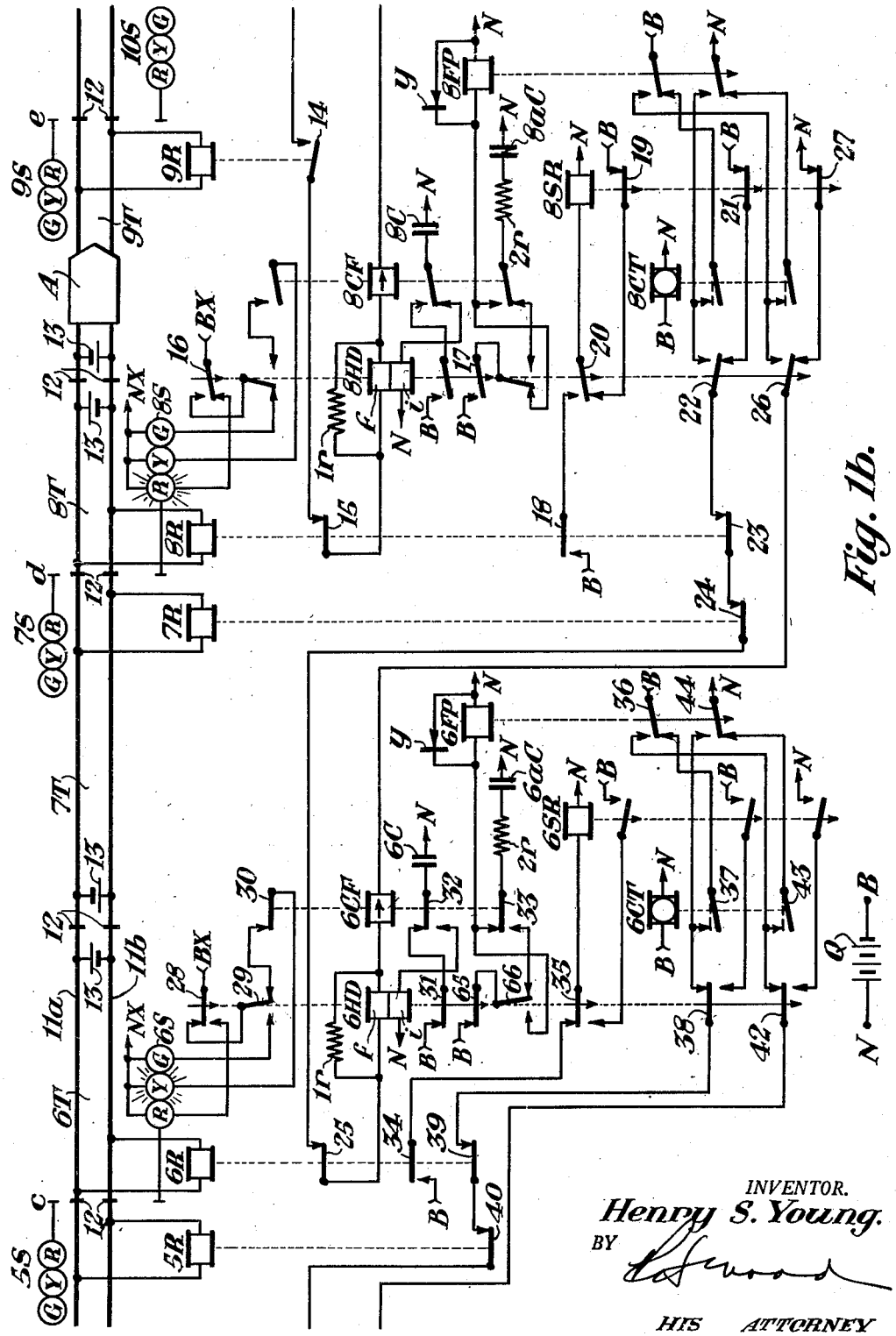

The accompanying drawings, Figs. 1a and 1b, when placed end to end, with Fig. 1a on the left, constitute a diagrammatic view showing one form of apparatus embodying my invention, in which a four-indication control system for a plurality of successive signals includes a plurality of signal control circuits, one for each signal, each of which control circuits embodies a first control winding of a polarized signal control relay in series with the control winding of a polar biased code following relay, and each of which control circuits at times is energized by steady current and at other times is energized by periodically interrupted or coded current. A second control winding of each of the polarized signal control relays is energized by auxiliary means controlled in part by the associated polar biased code following relay, during the periods of interruption of the periodically interrupted or coded current in the corresponding signal control circuit. A repeater relay for each signal is controlled by the polarized signal control relay and by the polar biased code following relay for the same signal so that it checks operation of the polar biased code following relay.

Similar reference characters refer to similar parts in the drawings.

Referring further to the drawings, the reference characters 11a and 11b designate the rails of a stretch of railway track over which traffic may move in either direction. I shall assume that the direction toward the right, as shown in the drawings, is eastbound, whereas the opposite direction, toward the left, is westbound.

Rails 11a and 11b are divided by insulated joints 12 into blocks a—b, b—c, c—d and d—e. Each of these blocks is further divided by other insulated joints 12 into two sections. Block a—b, for example, is divided into sections 2T and 3T. Each track section is provided with a track circuit including a suitable source of current, such for example as a battery 13, connected across the rails adjacent one end of the section, and a track relay, designated by the reference character R with a numerical prefix which is the same as that in the reference character for the associated section.

Signals, designated by the reference characters 1S, 3S, 5S, 7S and 9S, are shown adjacent points a, b, c, d and e, respectively, for governing westbound traffic movements, and signals, designated by the reference characters 2S, 4S, 6S, 8S and 10S, are shown adjacent points a, b, c, d, and e, respectively, for governing eastbound traffic movements. Although the signals, as shown, are of the well-known color light type, each having a green lamp G, a yellow lamp Y, and a red lamp R, it is to be understood that my invention is not limited to signals of this type.

A polarized line relay or signal control relay, designated by the reference character HD with a numerical prefix which is the same as that in the reference character for the associated signal, and a polar biased code following relay, designated by the reference character CF with a numerical prefix which is also the same as that in the reference character for the associated signal, are provided for each signal. Each of the polarized line relays HD has a first control winding designated by the reference character $f$, and has a second control winding designated by the reference character $i$.

The lamps G, Y, and R of each signal are lighted by circuits controlled by the relay HD for the corresponding signal. The circuit for lamp Y of each signal is also controlled by the relay CF for the corresponding signal.

Each of the CF relays, when energized by current flowing through its winding in the reverse direction, indicated by the arrow shown in its symbol, closes its front contacts. When each CF relay is deenergized, or when it is energized by current flowing in the opposite or normal direction, its back contacts become closed.

Two energy storing devices, such, for example, as capacitors, are provided for each signal. The first energy storing device for each signal is designated by the reference character C with a numerical prefix which is the same as that in the reference character for the associated signal. The second energy storing device for each signal is designated by the reference character $aC$ with a numerical prefix which is the same as that in the reference character for the associated signal. The first energy storing device for each signal is provided with a charging circuit which includes front contacts of the polar biased code following relay and the polarized signal control relay for the corresponding signal. The second energy storing device for each signal is provided with a charging circuit which includes a front neutral contact and a reverse polar contact of the polarized signal control relay and a back contact of the polar biased code following relay for the corresponding signal.

A repeater relay, designated by the reference character FP with a numerical prefix which is the same as that in the reference character for the associated signal, is provided for each signal. Each relay FP is made slow releasing by means of an asymmetric unit, designated by the reference character $y$, connected across its winding. Asymmetric unit $y$ may be of the well-known copper oxide rectifier type. Each of the relays FP is at times energized by a circuit which includes a front neutral contact and a normal polar contact of the polarized signal control relay for the associated signal. Each of the relays FP is energized at other times by a circuit which includes a front contact of the polar biased code following relay, and which also includes a second energy storing device, for the corresponding signal.

A code transmitting device for each signal is designated by the reference character CT with a numerical prefix which is the same as that in the reference character for its signal. Each of these code transmitters is constantly energized, and therefore repeatedly closes and opens its contacts.

A directional stick relay, designated by the reference character SR, with a numerical prefix which is the same as the number in the reference character for its signal, is shown for each of the signals 4S, 6S, and 8S.

Each of the signals is provided with a control circuit which includes a corresponding polar biased code following relay CF in series with the first control winding $f$ of a polarized signal control relay HD for the corresponding signal. A resistor, designated by the reference character $1r$, is connected in multiple with the first control winding $f$ of each relay HD, in order to make the neutral contacts of the associated relay HD slow to release.

Each of the signal control circuits is energized at times by steady current of normal polarity, at other times by steady current of reverse polarity, and at still other times by periodically interrupted or coded current of reverse polarity.

The first energy storing device for each signal becomes charged when the polarized signal control relay HD and the polar biased code following relay CF for the same signal become energized by current of reverse polarity. During the periods of interruption of the periodically interrupted or coded current of reverse polarity supplied to any of the signal control circuits, the relay CF in the corresponding signal control circuit releases its contacts, so that they become opened at the front points and closed at the back points. The second control winding $i$ of the associated polarized signal control relay then becomes energized from the first energy storing device C, during the periods of interruption of the periodically interrupted current of reverse polarity, by a circuit which includes a back contact of the polar biased code following relay for the same signal.

The second energy storing device $aC$ for each signal becomes charged during the periods of interruption of the periodically interrupted current of reverse polarity. The repeater relay for the same signal becomes energized from the second energy storing device, during the periods when the signal control circuit is energized by periodically interrupted current of reverse polarity, by a circuit which includes a front contact of the polar biased code following relay for the corresponding signal.

The lamps of the signals may be energized by current from any suitable source such, for example, as an alternating current generator designated by the reference L, shown in Fig. 1a, and which supplies current through a transmission line having terminals designated BX and NX.

Circuits for energizing the control apparatus may be supplied with current from any suitable source such, for example, as a battery shown in Fig. 1b, designated by the reference character Q and having terminals B and N.

It is assumed that the control apparatus and the circuits for the westbound signals will be similar to the control apparatus and circuits shown for the eastbound signals. Therefore, in order to simplify the drawings, the control apparatus and circuits for the westbound signals have been omitted.

As shown in Fig. 1b, section 9T is occupied by an eastbound train A. The meanings of the indications displayed by the signals 2S, 4S, 6S and 8S, when train A is located as shown, are given in the following table:

| Signal | Indication Displayed | Meaning of Indication |
| --- | --- | --- |
| 2S | Steady green | First three blocks in advance of signal 2S are clear. |
| 4S | Flashing yellow | First two blocks in advance are clear, but third block is occupied. |
| 6S | Steady yellow | First block in advance is clear, but second block is occupied. |
| 8S | Steady red | First block in advance of Signal 8S is occupied. |

I shall now describe the manner in which these indications are controlled to be displayed, under the conditions assumed.

With train A occupying section 9T, track relay 9R is deenergized, and hence the line circuit including contacts 14 and 15 of relays 9R and 8R, respectively, for energizing relays 8HD and 8CF is open at contact 14 of relay 9R. Relays 8HD and 8CF are therefore deenergized.

With relay 8HD deenergized, its contact 16 is closed at the back point, and therefore lamp R of signal 8S is lighted by a circuit passing from terminal BX, through the back point of contact 16 of relay 8HD, and lamp R of signal 8S to terminal NX. With contact 17 of relay 8HD open, relay 8FP is deenergized.

It is assumed that when train A entered section 8T, the front contacts of relay 8HD were closed. Relay 8SR therefore became energized by a pickup circuit passing from terminal B, through contact 18 of relay 8R, front point of contact 20 of relay 8HD, and the winding of relay 8SR to terminal N. Upon the lapse of a brief period of time, contact 20 of relay 8HD became opened at its front point, and became closed at its back point, thereby completing a stick circuit for relay 8SR, passing from terminal B, through contact 19 of relay 8SR, back point of contact 20 of relay 8HD, and the winding of relay 8SR to terminal N. With relay 8HD still in the deenergized condition, relay 8SR is therefore retained in the energized condition by its stick circuit just traced.

With relay 8SR energized and relay 8HD deenergized, the circuit which includes relay 6CF and the first control winding f of relay 6HD is energized by steady current of reverse polarity passing from terminal B, through contact 21 of relay 8SR, back point of contact 22 of relay 8HD, contacts 23, 24, and 25 of relays 8R, 7R, and 6R respectively, winding f of relay 6HD in multiple with a resistor 1r, winding of relay 6CF, back point of contact 26 of relay 8HD, and contact 27 of relay 8SR to terminal N. With relays 6HD and 6CF energized by steady current of reverse polarity, polar contact 29 of relay 6HD will be closed in its reverse position, and contact 30 of relay 6CF will be constantly closed.

Lamp Y of signal 6S is therefore lighted by a circuit passing from terminal BX, through the front point of contact 28 of relay 6HD, contact 29 of relay 6HD closed in the reverse position, contact 30 of relay 6CF, and lamp Y of signal 6S to terminal NX. Lamp Y of signal 6S is therefore displaying a steady yellow approach indication.

With relays 6HD and 6CF energized by steady current of reverse polarity, a charging circuit for capacitor 6C is constantly closed, passing from terminal B, through contact 31 of relay 6HD, front point of contact 32 of relay 6CF, and capacitor 6C to terminal N. Contact 33 of relay 6CF is constantly closed at its front point, and therefore the charging circuit for capacitor 6aC is open, and capacitor 6aC and relay 6FP are both deenergized.

With relays 6R and 6HD both energized, relay 6SR is deenergized.

With relay 6FP deenergized and relay 6HD energized, the signal control circuit which includes relays 4HD and 4CF is energized by periodically interrupted or coded current of reverse polarity passing from terminal B, through the back point of contact 36 of relay 6FP, contact 37 of code transmitter 6CT, front point of contact 38 of relay 6HD, contacts 39, 40, and 41 of relay 6R, 5R, and 4R, respectively, first control winding f of relay 4HD connected in multiple with a resistor 1r, the winding of relay 4CF, front point of contact 42 of relay 6HD, contact 43 of code transmitter 6CT, and the back point of contact 44 of relay 6FP to terminal N. With relay 4CF and winding f of relay 4HD energized by periodically interrupted current of reverse polarity, contact 45 of relay 4HD will be closed, and contact 46 of relay 4CF will be repeatedly closed alternately at its front and back points.

During the periods when contact 46 of relay 4CF is closed at its front point, the charging circuit for capacitor 4C will be completed, this circuit passing from terminal B, through contact 45 of relay 4HD, front point of contact 46 of relay 4CF, and capacitor 4C to terminal N. During the periods of interruption of the current in the control circuit for relay 4CF and winding f of relay 4HD, contact 46 of relay 4CF will be closed at its back point, and therefore winding i of relay 4HD will be energized from capacitor 4C by a circuit passing from capacitor 4C, through the back point of contact 46 of relay 4CF, winding i of relay 4HD, and terminal N, back to capacitor 4C. The front contacts of relay 4HD will therefore remain closed during the periods of interruption of the current in the control circuit which includes relay 4CF and winding f of relay 4HD.

Lamp Y of signal 4S will now be periodically lighted by a circuit passing from terminal BX, through the front point of contact 47 of relay 4HD, contact 48 of relay 4HD closed in the reverse position, contact 49 of relay 4CF, and lamp Y of signal 4S to terminal NX. Signal 4S is therefore displaying a flashing yellow medium speed indication.

Since the control circuit which includes relay 4CF and winding f of relay 4HD is energized by periodically interrupted current of reverse polarity, contact 52 of relay 4CF will be repeatedly closed alternately at its front and back points. During the periods when contact 52 of relay 4CF is closed at its back point, the second energy storing device for signal 4S will be charged by a circuit passing from terminal B, through contact 50 of relay 4HD, contact 51 of relay 4HD closed in the reverse position, back point of contact 52 of relay 4CF, resistor 2r, and capacitor 4aC to terminal N. During the periods when contact 52 is closed at its front point, relay 4FP will be energized from capacitor 4aC by a circuit passing from capacitor 4aC, through resistor 2r, front point of contact 52 of relay 4CF, and relay 4FP in multiple with the high resistance direction of asymmetric unit y to terminal N.

With relays 4R and 4HD both energized, relay 4SR will be deenergized.

The signal control circuit which includes relay 2CF and winding f of relay 2HD will be energized by steady current of normal polarity passing from terminal B, through the front point of contact 55 of relay 4FP, front point of contact 56 of relay 4HD, winding of relay 2CF, winding f of relay 2HD in multiple with resistor 1r, contacts 57, 58, and 59 of relays 2R, 3R, and 4R, respectively, front point of contact 60 of relay 4HD, and front point of contact 61 of relay 4FP to terminal N. With relay 2CF energized by current of normal polarity, its contact 62 will remain constantly closed at its back point, and therefore capacitor 2C cannot become charged. Winding i of relay 2HD will therefore be deenergized, but the front contacts of relay 2HD will remain closed because of the constant energization of winding f of relay 2HD.

With relay 2HD energized by current of normal polarity, lamp G of signal 2S will be constantly lighted by a circuit passing from terminal BX, through the front point of contact 63 of relay 2HD, contact 64 of relay 2HD closed in the normal position, and lamp G of signal 2S to terminal NX. Signal 2S is therefore displaying a steady green clear proceed indication.

It will be noted that, in apparatus embodying my invention, each of the polarized signal control relays such, for example, as relay 4HD, may be of well-known design for operation by steady current, having a first control winding f and a second control winding i. Relay 4HD closed its front contacts, and capacitor 4C became charged, in response to energization of relays 4HD and 4CF by steady current of reverse polarity when train A left section 6T. Relays 4HD and 4CF subsequently became energized by coded current of reverse polarity when train A left section 8T. Winding f of relay 4HD, is now periodically energized by the periodically interrupted or coded current of reverse polarity in the signal control circuit which includes relay 4CF and the first control winding f of relay 4HD.

Capacitor 4C becomes charged during each period of energization of relay 4CF and winding f of relay 4HD by coded current of reverse polarity. During the periods of interruption of the coded current in the signal control circuit, the second control winding i of relay 4HD is energized by pulses of current discharged from capacitor 4C. By energization of winding i of relay 4HD during the periods when winding f of relay 4HD is deenergized, the neutral contacts of relay 4HD are retained closed at their front points.

Accordingly, in a four-indication signal control system embodying my invention, polarized relays of well-known design for operation by steady current may be used, so that polarized relays specially designed, for operation by periodically interrupted or coded current, are not required.

If repeater relays such, for example, as relay 6FP, were controlled directly by a control circuit including contact 65 of relay 6HD, contact 66 of relay 6HD closed in the reverse position, and the back point of contact 33 of relay 6CF, and if relay 6CF should become inoperative, so that its contacts remained closed at their back points while relay 6CF is periodically energized by current of reverse polarity, relay 6FP would be energized when it should be deenergized, and signal 4S would therefore be controlled to display a steady green indication instead of a flashing yellow indication. In apparatus embodying my invention, when the signal control circuit which includes relays 6HD and 6CF is energized by periodically interrupted current of reverse polarity, relay 6FP can be energized only by pulses of current discharged from energy storing device 6aC when contact 33 of relay 6CF is closed at its front point. Energy storing device 6aC can become charged only when contact 33 of relay 6CF is closed at its back point.

It follows that relay 6FP cannot become energized unless relay 6CF closes contact 33 at its front and back points alternately, in response to the periodically interrupted current of reverse polarity. Relay 6FP, therefore, cannot become falsely energized to cause signal 4S to display a steady green indication when it should be displaying the more restrictive flashing yellow indication, if relay 6CF should become inoperative.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In a railway signal control system for a stretch of railway track which is divided into a plurality of successive blocks, including a plurality of signals one for each of said blocks for governing traffic movements in a given direction over said stretch of railway track, the combination comprising for each of said signals, a polarized signal control relay having a first and a second control winding, a polar biased code following relay responsive to current of only reverse polarity for opening a back contact and closing a front contact, a signal control circuit including said polar biased code following relay and said first control winding of said polarized signal control relay, a first energy storing device, a charging circuit for said first energy storing device controlled by front contacts of said polarized and polar biased code following relays, a circuit controlled by a back contact of said code following relay for energizing said second control winding of said polarized signal control relay from said first energy storing device, a repeater relay, means controlled by a front neutral and a normal polar contact of said polarized signal control relay for energizing said repeater relay, a second energy storing device, means controlled by a front neutral and a reverse polar contact of said polarized signal control relay and by a back contact of said polar biased code following relay for charging said second energy storing device, a circuit controlled by a front contact of said polar biased code following relay for energizing said repeater relay from said second energy storing device, a code transmitter, means including front contacts of the repeater relay and the polarized signal control relay for each of said signals for energizing the signal control circuit for the next signal in the rear by steady current of normal polarity, means including a contact of said code transmitter and a front contact of said polarized signal control relay and also a back contact of said repeater relay for each of said signals for energizing the signal control circuit for the next signal in the rear by periodically interrupted current of reverse polarity, means controlled by a front neutral and a normal polar contact of each of said polarized signal control relays for controlling the associated signal to display a steady clear indication, and means controlled by a front neutral and a reverse polar contact of each of said polarized signal control relays and also by a front contact of the associated polar biased code following relay for controlling the associated signal to display a flashing medium speed indication.

2. In a railway signal control system for a stretch of railway track which is divided into a plurality of successive blocks, including a plurality of signals one for each of said blocks for governing traffic movements in a given direction over said stretch of railway track, the combination comprising for each of said signals, a polarized signal control relay having a first and a second control winding, a polar biased code following relay responsive to current of only reverse polarity for opening a back contact and closing a front contact, a signal control circuit including said polar biased code following relay and said first control winding of said polarized signal control relay, a first energy storing device, a charging circuit for said first energy storing device controlled by front contacts of said polarized and polar biased code following relays, a circuit controlled by a back contact of said code following relay for energizing said second control winding of said polarized signal control relay from said first energy storing device, a repeater relay, means controlled by a front neutral and a normal polar contact of said polarized signal control relay for energizing said repeater relay, a second energy storing device, means controlled by a front neutral and a reverse polar contact of said polarized signal control relay and by a back contact of said polar biased code following relay for charging said second energy storing device, a circuit controlled by a front contact of said polar biased code following relay for energizing said repeater relay from said second energy storing device, means including contacts of the polarized signal control relay and the repeater relay for each of said signals for energizing the signal control circuit for the next signal in the rear by steady current of normal polarity or by periodically interrupted current of reverse polarity according as the repeater relay is energized or deenergized respectively while the polarized signal control relay is energized, means controlled by a front neutral and a normal polar contact of said polarized signal control relay for controlling the associated signal to display a steady indication, and means controlled by a front neutral and a reverse polar contact of said polarized signal control relay and also by a contact of the associated polar biased code following relay for controlling the associated signal to display a flashing indication.

3. In combination, a stretch of railway track, a first signal for governing traffic movements over said stretch, a polarized signal control relay having a first and a second control winding, a polar biased code following relay, a signal control circuit including said polar biased code following relay and said first control winding of said polarized signal control relay arranged so that said polar biased code following relay will respond to only current of reverse polarity for opening its back contacts and closing its front contacts, means for energizing said signal control circuit by steady current of normal polarity or by periodically interrupted current of reverse polarity, auxiliary means controlled by said polar biased code following relay for energizing said second control winding of said polarized signal control relay during the periods of interruption of said current of reverse polarity, a repeater relay, means controlled by a front neutral and a normal polar contact of said polarized signal control relay for energizing said repeater relay, auxiliary means controlled by means including said polar biased code following relay for energizing said repeater relay only if said polar biased code following relay is operating in response to coded current of reverse polarity, means controlled by said polarized signal control relay when energized by current of normal polarity for controlling said first signal to display a steady indication, means controlled by said polarized signal control relay and by said polar biased code following relay when energized by periodically interrupted current of reverse polarity for controlling said first signal to display a flashing indication, a second signal in the rear of said first signal for governing traffic movements toward said first signal, and means including said polarized signal control relay and said repeater relay for controlling said second signal to display a steady or a flashing indication according as said repeater relay is energized or deenergized respectively while said polarized signal control relay is energized.

4. In combination, a stretch of railway track, a signal for governing traffic movements over said stretch, a polarized signal control relay having a first and a second control winding, a polar biased code following relay, a signal control circuit including said polar biased code following relay and said first control winding of said polarized signal control relay arranged so that said polar biased code following relay will respond to only current of reverse polarity for opening back contacts and closing front contacts, means for energizing said signal control circuit by steady current of normal polarity or by periodically interrupted current of reverse polarity, auxiliary means controlled by said polar biased code following relay and by said polarized signal control relay for energizing said second control winding of said polarized signal control relay during the periods of interruption of said current of reverse polarity, means controlled by said polarized signal control relay when energized by current of normal polarity for controlling said signal to display a steady indication, and means controlled by said polarized signal control relay and by said polar biased code following relay when energized by periodically interrupted current of reverse polarity for controlling said signal to display a flashing indication.

5. In combination, an electrical device operable to a first or a second condition, a polarized control relay having a first and a second control winding, a polar biased code following relay, a control circuit including said polar biased code following relay and said first control winding of said polarized control relay arranged so that said polar biased code following relay will respond to only current of reverse polarity for opening back contacts and closing front contacts, means for energizing said control circuit at times by steady current of normal polarity and at other times by periodically interrupted current of reverse polarity, auxiliary means controlled by said polar biased code following relay and by said polarized control relay for energizing said second control winding of said polarized control relay during the periods of interruption of said current of reverse polarity, means controlled by said polarized control relay when energized by current of normal polarity for effecting operation of said electrical device to said first condition, and means controlled by said polarized control relay and by said polar biased code following relay when energized by periodically interrupted current of reverse polarity for effecting operation of said electrical device to said second condition.

6. In combination, a stretch of railway track, a first signal for governing traffic movements over said stretch, a polarized signal control relay, a polar biased code following relay, a signal control circuit including said polar biased code following relay and said polarized signal control relay arranged so that said polar biased code following relay will respond to only current of reverse polarity for opening back contacts and closing front contacts, means for energizing said signal control circuit by steady current of normal polarity or by periodically interrupted current of reverse polarity, a repeater relay, means controlled by a front neutral and a normal polar contact of said polarized signal control relay for energizing said repeater relay, auxiliary means controlled by means including said polar biased code following relay for energizing said repeater relay only if said polar biased code following relay is operating in response to coded current of reverse polarity, means controlled by said polarized signal control relay when energized by current of normal polarity for controlling said first signal to display a steady indication, means controlled by said polarized signal control relay and by said polar biased code following relay when energized by periodically interrupted current of reverse polarity for controlling said first signal to display a flashing indication, a second signal in the rear of said first signal for governing traffic movements toward said first signal, and means including said polarized signal control relay and said repeater relay for controlling said second signal.

7. In combination, a stretch of railway track, a first signal for governing traffic movements over said stretch, a polarized signal control relay, a polar biased code following relay, a signal control circuit including said polar biased code following relay and said polarized signal control relay arranged so that said polar biased code following relay will respond to only current of reverse polarity for opening back contacts and closing front contacts, means for energizing said signal control circuit by steady current of normal polarity or by periodically interrupted current of reverse polarity, a repeater relay, an energy storing device, a charging circuit for said energy storing device controlled by a front neutral and a reverse polar contact of said polarized signal control relay and by a back contact of said polar biased code following relay, means controlled by a front neutral and a normal polar contact of said polarized signal control relay for energizing said repeater relay, means including a front contact of said polar biased code following relay for energizing said repeater relay from said energy storing device, a second signal in the rear of said first signal for governing traffic movements toward said first signal, and means including contacts of said polarized signal control relay and said repeater relay for controlling said second signal.

8. In combination, a stretch of railway track, a signal for governing traffic movements over said stretch, a polarized signal control relay having a first and a second control winding, a polar biased code following relay, a signal control circuit including said polar biased code following relay and said first control winding of said polarized signal control relay arranged so that said polar biased code following relay will respond to only current of reverse polarity for opening back contacts and closing front contacts, means for energizing said signal control circuit by steady current of normal polarity or by periodically interrupted current of reverse polarity, an energy storing device, a charging circuit for said energy storing device controlled by front contacts of said polarized signal control relay and said polar biased code following relay, a circuit controlled by a back contact of said polar biased code following relay for energizing said second control winding of said polarized signal control relay from said energy storing device, means controlled by a front neutral and a normal polar contact of said polarized signal control relay for controlling said signal to display a clear indication, and means controlled by a front neutral and a reverse polar contact of said polarized signal control relay and by a front contact of said polar biased code following relay for controlling said signal to display a medium speed indication.

9. In combination, a stretch of railway track, a signal for governing traffic movements over said stretch, a polarized signal control relay having a first and a second control winding, a polar biased code following relay, a signal control circuit including said polar biased code following relay and said first control winding of said polarized signal control relay arranged so that said polar biased code following relay will respond to only current of reverse polarity for opening its back contacts and closing its front contacts, means for energizing said signal control circuit at times by steady current of normal polarity and at other times by coded current of reverse polarity, auxiliary means comprising an energy storing device controlled by said polar biased code following relay for energizing said second control winding of said polarized signal control relay during the periods of interruption of said current of reverse polarity, means controlled by a front neutral and a normal polar contact of said polarized signal control relay for controlling said signal to display a steady indication, and means controlled by a front neutral and a reverse polar contact of said polarized signal control relay and by a contact of said polar biased code following relay for controlling said signal to display a flashing indication.

10. In combination, a stretch of railway track, a signal for governing traffic movements over said stretch, a polarized signal control relay having a first and a second control winding, a polar biased code following relay, a signal control circuit including said polar biased code following relay and said first control winding of said polarized signal control relay arranged so that said polar biased code following relay will respond to only current of reverse polarity for opening its back contacts and closing its front contacts, means for energizing said signal control circuit at times by steady current of normal polarity and at other times by coded current of reverse polarity, an energy storing device, means including a front contact of said polar biased code following relay for effecting energization of said energy storing device, means including a back contact of said polar biased code following relay for effecting energization of said second control winding of said polarized signal control relay from said energy storing device, means controlled by said polarized signal control relay when energized by current of normal polarity for controlling said signal to display a steady clear proceed indication, and means controlled by said polarized signal control relay and by said polar biased code following relay when energized by coded current of reverse polarity for controlling said signal to display a flashing medium speed indication.

11. In combination, a stretch of railway track, a first signal for governing traffic movements over said stretch, a polarized signal control relay, a polar biased code following relay, a signal control circuit including control windings of said polarized signal control relay and said polar biased code following relay arranged so that said polar biased code following relay will respond to only current of reverse polarity for opening its back contacts and closing its front contacts, means for energizing said signal control circuit at times by steady current of normal polarity and at other times by periodically interrupted current of reverse polarity, means controlled by said polarized signal control relay when energized by current of normal polarity for controlling said first signal to display a clear proceed indication, means controlled by said polarized signal control relay and by said polar biased code following relay when energized by periodically interrupted current of reverse polarity for controlling said first signal to display a flashing medium speed indication, a repeater relay, means controlled by said polarized signal control relay when energized by current of normal polarity for energizing said repeater relay, means controlled by said polarized signal control relay and by said polar biased code following relay when energized by periodically interrupted current of reverse polarity for also energizing said repeater relay only if said polar biased code following relay is repeatedly closing its front and back contacts alternately, a second signal in the rear of said first signal for governing traffic movements toward said first signal, and means including a front contact of said repeater relay for controlling said second signal to display a steady clear indication.

12. In combination, a stretch of railway track, a first signal for governing traffic movements over said stretch, a polarized signal control relay, a polar biased code following relay, a signal control circuit including control windings of said polarized signal control relay and said polar biased code following relay arranged so that said polar biased code following relay will respond to only current of reverse polarity for opening its back contacts and closing its front contacts, means for energizing said signal control circuit at times by steady current of normal polarity and at other times by periodically interrupted current of reverse polarity, means controlled by said polarized signal control relay when energized by current of normal polarity for controlling said first signal to display a clear proceed indication, means controlled by said polarized signal control relay and by said polar biased code following relay when energized by periodically interrupted current of reverse polarity for controlling said first signal to display a flashing medium speed indication, a repeater relay, means controlled by said polarized signal control relay when energized by current of normal polarity for energizing said repeater relay, an energy storing device, means including a reverse polar contact of said polarized signal control relay and a back contact of said polar biased code following relay for effecting energization of said energy storing device, means controlled by a front contact of said polar biased code following relay for energizing said repeater relay from said energy storing device, a second signal in the rear of said first signal for governing traffic movements toward said first signal, and means including a front contact of said repeater relay for controlling said second signal to display a steady clear indication.

References Cited in the file of this patent
UNITED STATES PATENTS

| Number | Name | Date |
| --- | --- | --- |
| 2,164,668 | Sorenson | July 4, 1939 |
| 2,276,680 | Allen | Mar. 17, 1942 |
| 2,638,536 | Tizzard, Jr. | May 12, 1953 |